(12) United States Patent
Lin et al.

(10) Patent No.: US 7,570,248 B2
(45) Date of Patent: Aug. 4, 2009

(54) MOUSE HAVING STORABLE HOOK MODULE

(75) Inventors: Chih-Hung Lin, Taipei (TW); Hsiao-Lung Chiang, Taipei (TW); Chih-Ling Lin, Taipei (TW); Yu-Chih Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 593 days.

(21) Appl. No.: 11/365,941

(22) Filed: Mar. 1, 2006

(65) Prior Publication Data

US 2007/0132731 A1 Jun. 14, 2007

(30) Foreign Application Priority Data

Dec. 9, 2005 (TW) .............................. 94143533 A

(51) Int. Cl.
*G06F 3/033* (2006.01)
(52) U.S. Cl. .................................... 345/163; 248/316.7
(58) Field of Classification Search .................. 345/163
See application file for complete search history.

(56) References Cited

U.S. PATENT DOCUMENTS

| | | | | | |
|---|---|---|---|---|---|
| 1,619,810 | A | * | 3/1927 | Cautley | 188/194 |
| 2,990,123 | A | * | 6/1961 | Hyde | 239/453 |
| 3,007,444 | A | * | 11/1961 | Lockwood | 401/113 |
| 4,837,929 | A | * | 6/1989 | Tanahashi et al. | 30/43.92 |
| 5,006,836 | A | * | 4/1991 | Cooper | 345/163 |
| 5,268,675 | A | * | 12/1993 | Garthwaite et al. | 345/163 |
| 6,163,326 | A | * | 12/2000 | Klein et al. | 345/156 |
| 6,173,843 | B1 | * | 1/2001 | Christensen et al. | 211/41.17 |
| 6,308,956 | B1 | * | 10/2001 | Reid | 273/343 |
| 6,784,870 | B2 | * | 8/2004 | Yin | 345/156 |
| 2004/0233620 | A1 | * | 11/2004 | Doczy et al. | 361/680 |
| 2004/0236396 | A1 | * | 11/2004 | Coe et al. | 607/116 |
| 2005/0012711 | A1 | * | 1/2005 | Paolucci et al. | 345/156 |

* cited by examiner

*Primary Examiner*—Richard Hjerpe
*Assistant Examiner*—Dorothy Webb
(74) *Attorney, Agent, or Firm*—Apex Juris, pllc; Tracy M Heims

(57) ABSTRACT

A mouse has a storable hook module, which is stored within the main body of the mouse in most circumstance. In a case that the notebook computer is carried to another place, the hook module should be protruded from the main body of the mouse and then secured onto lock hole at a side wall of the notebook computer, so that the mouse is attached onto the notebook computer.

5 Claims, 6 Drawing Sheets

MOUSE HAVING STORABLE HOOK MODULE

FIELD OF THE INVENTION

The present invention relates to a mouse having a storable hook module, and more particularly to a mouse having a storable hook module such that the mouse is attachable to a notebook computer.

BACKGROUND OF THE INVENTION

In modern society, notebook computers are increasingly used because they are portable and convenient. For most notebook computers, a touch pad is used as the input device.

Furthermore, in order to comply with the user's habit, a mouse is also served as the input device of the notebook computer. Especially when the notebook computer is used in the office, the mouse becomes an essential peripheral device.

In a case that the notebook computer needs to be used in other places, for example in a conference room, the user should carry a mouse at the same time. In other words, since the mouse and the notebook computer are separate components, the probability of falling down the mouse is increased during the process of carrying the notebook computer along with the mouse.

For a purpose of solving such a problem, a mouse attachable to the notebook book is disclosed in U.S. Pat. No. 6,784,870, entitled "Portable computer system including detachable peripheral device and combined mouse/joystick for use with same". Please refer to FIG. 1. The notebook computer having a detachable mouse as shown in U.S. Pat. No. 6,784,870 comprises a notebook computer 10, a mouse body 20 and a coupling mechanism 30. By means of the coupling mechanism 30, the mouse body 20 is attached to the notebook computer 10.

Another design for attaching the mouse onto the notebook computer is disclosed in Taiwanese Patent Gazette No. 398642, entitled "Device for storing a mouse within the casing of a computer". Please refer to FIG. 2. As shown in Taiwanese Patent Gazette No. 398642, the notebook computer 40 has a receptacle 50 for storing the mouse 60 therein.

However, in the mentioned prior art, for attaching the mouse to the notebook, the notebook and mouse must have corresponding coupling mechanism to match with each other. In other words, different types of mice fail to be attached onto a same type of notebook computer, and thus the coupling mechanism is not user-friendly.

In views of the above-described disadvantages resulted from the prior art, the applicant keeps on carving unflaggingly to develop a mouse having a storable hook module according to the present invention through wholehearted experience and research.

SUMMARY OF THE INVENTION

It is an object of the present invention to provide a mouse having a storable hook module such that the mouse is attached onto most notebook computers.

In accordance with an aspect of the present invention, there is provided a mouse having a storable hook module. The mouse comprises a casing and a hook module. The casing comprises a surface including first and second perforations and a retaining recess disposed within the casing. The hook module is disposed within the casing, and comprises an operating member, a hooking member and a spring. The operating member comprises a cover plate and an operating rod, wherein a portion of the operation rod is aligned with the first perforation. The hooking member is accommodated within the retaining recess and includes a hooking part in one end and a connecting part in the other end, wherein the hooking part is aligned with the second perforation. The spring is arranged in the retaining recess and sustained between the cover plate and the hooking member.

In an embodiment, the operating rod and the cover plate are integrally formed.

In an embodiment, the operating rod includes a resilient part and a stop part.

In an embodiment, the connecting part of the hooking member includes a circular disc.

In an embodiment, the hook module further comprises a universal joint between the spring and the hooking member, wherein the universal joint has a first circular indentation structure for accommodating one end of the spring and a second circular indentation structure for accommodating the circular disc of the hooking member.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
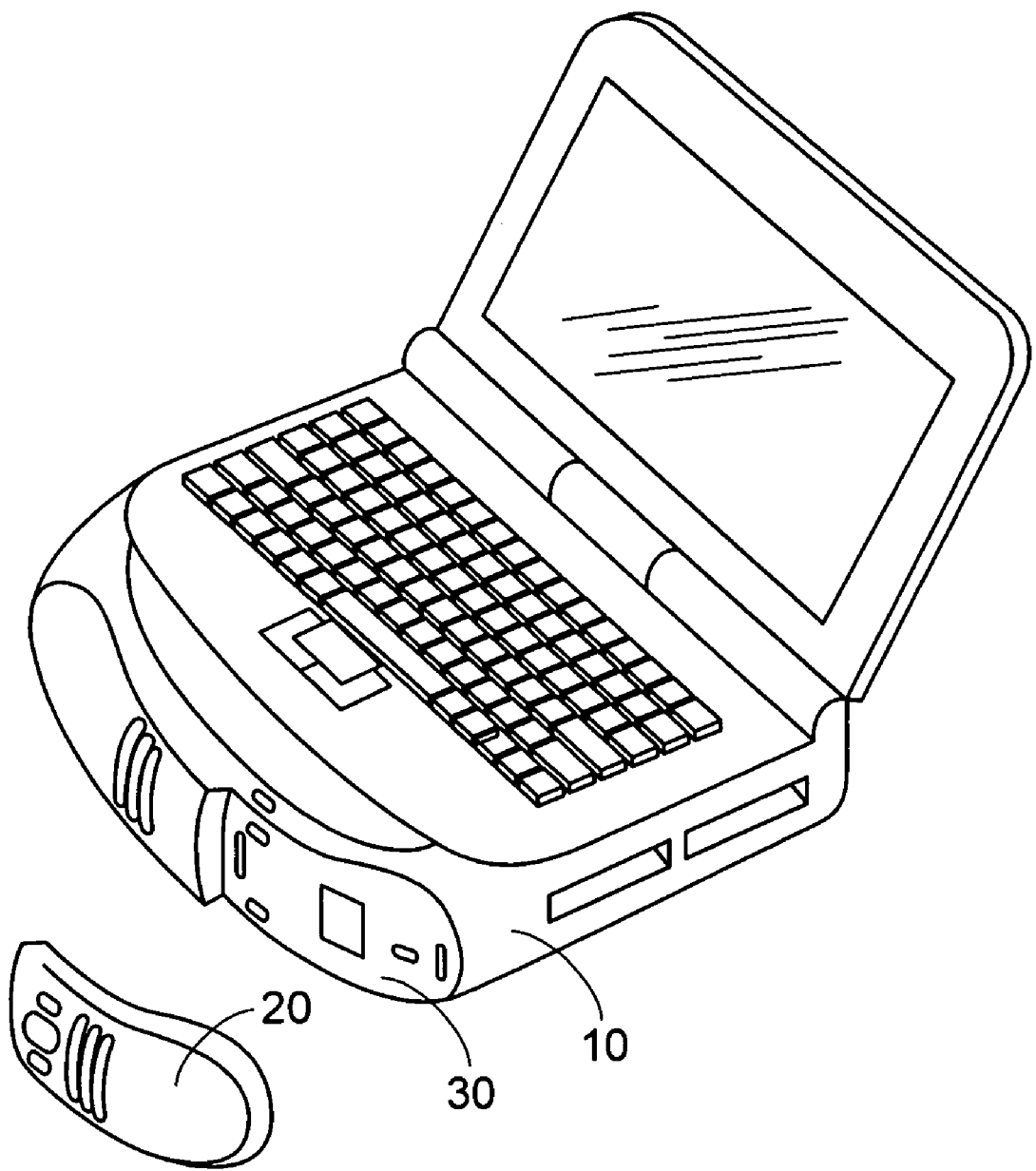
FIG. 1 is a schematic view of a notebook computer having an attachable mouse according to prior art.
Figure 2:
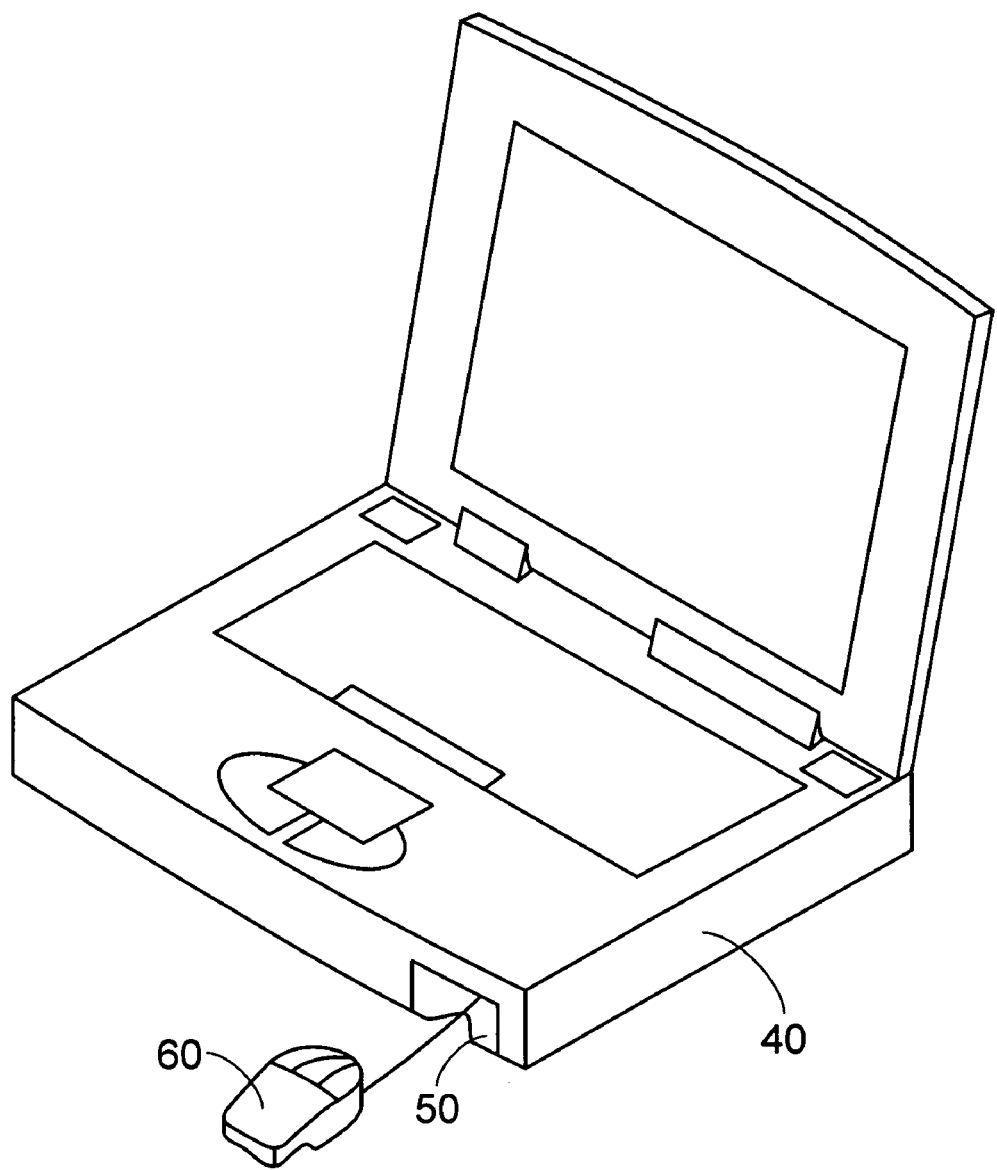
FIG. 2 is a schematic view of another notebook computer having an attachable mouse according to prior art.
Figure 3:
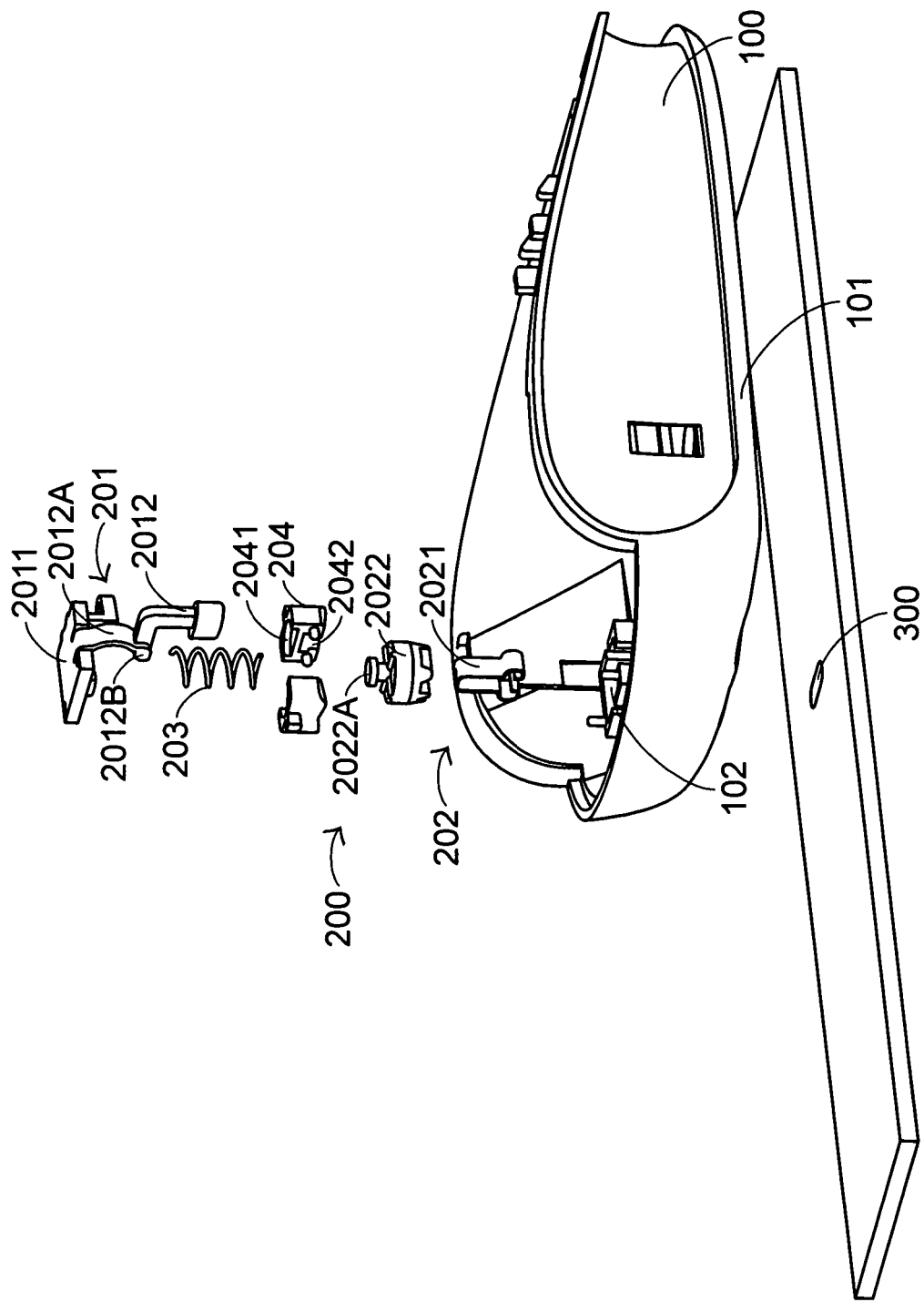
FIG. 3 is an exploded view of a mouse having a storable hook module according to a preferred embodiment of the present invention.

Referring to FIG. 3, an exploded view of a mouse having a storable hook module according to a preferred embodiment of the present invention is illustrated.

The mouse of the present invention comprises a casing 100 and a hook module 200. The casing 100 has a lower surface 101 and a retaining recess 102. The lower surface 101 has a first perforation 103 and a second perforation 104. The hook module 200 comprises an operating member 201, a hooking member 202, a spring 203 and a universal joint 204.

The operating member 201 comprises a cover plate 2011 and an operating rod 2012. The operating rod 2012 includes a resilient part 2012A and a stop part 2012B. One end of the hooking member 202 has a hooking part 2021 and the other end of the hooking member 202 is a connecting part 2022. The hooking part 2021 and the connecting part 2022 are hot-melted into one piece. The connecting part 2022 further comprises a circular disc 2022A. The universal joint 204 comprises a first circular indentation structure 2041 and a second circular indentation structure 2042.

A lock hole 300, which is commonly arranged in a notebook computer as a standard accessory, is also shown in FIG. 3. The lock hole 300 is referred as a "Kensington lock hole".

In a case that a lock is attached to the lock hole 300, the notebook will be fixed to any immovable object such as a desk, thereby preventing the notebook being stolen. Generally, notebook computers exhibited in the computer center or the exhibition place are locked in these lock holes. According to the present invention, the hook module 200 is secured onto the notebook computer by hooking the hooking part 2021 on the lock hole 300.

Figure 4:
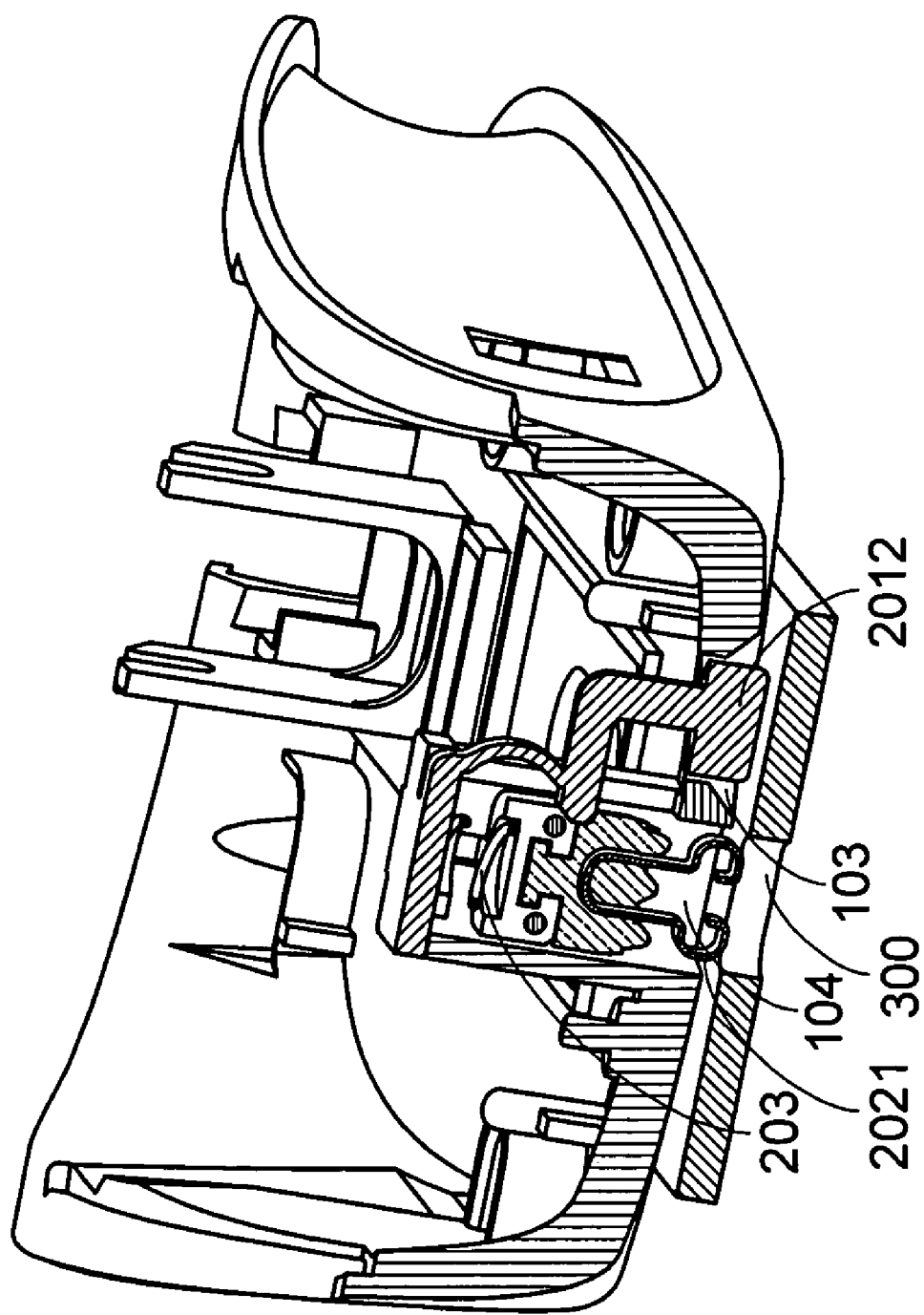
FIG. 4 is a schematic view illustrating that the hook module is stored within the main body of the mouse.

Referring to FIG. 4, the hook module 200 is assembled together and stored within the casing of the mouse.

As shown in FIG. 4, by screwing for example, the cover plate 2011 is fixed on the retaining recess 102. An end of the spring 203 is sustained against the cover plate 2011 and the other end of the spring 203 is accommodated within the first circular indentation structure 2041 of the universal joint 204. The circular disc 2022A of the connecting part 2022 of the hooking member 202 is accommodated within the second circular indentation structure 2042 of the universal joint 204. The second circular indentation structure 2042 of the universal joint 204 allows 360-degree rotation of the hooking member 202.

In the case that the hooking member 202 is stored within the retaining recess 102, the spring 203 is kept in the compressive state and stopped by the stop part 2012B of the operating member 201 to stop the hooking member 202.

Figure 5:
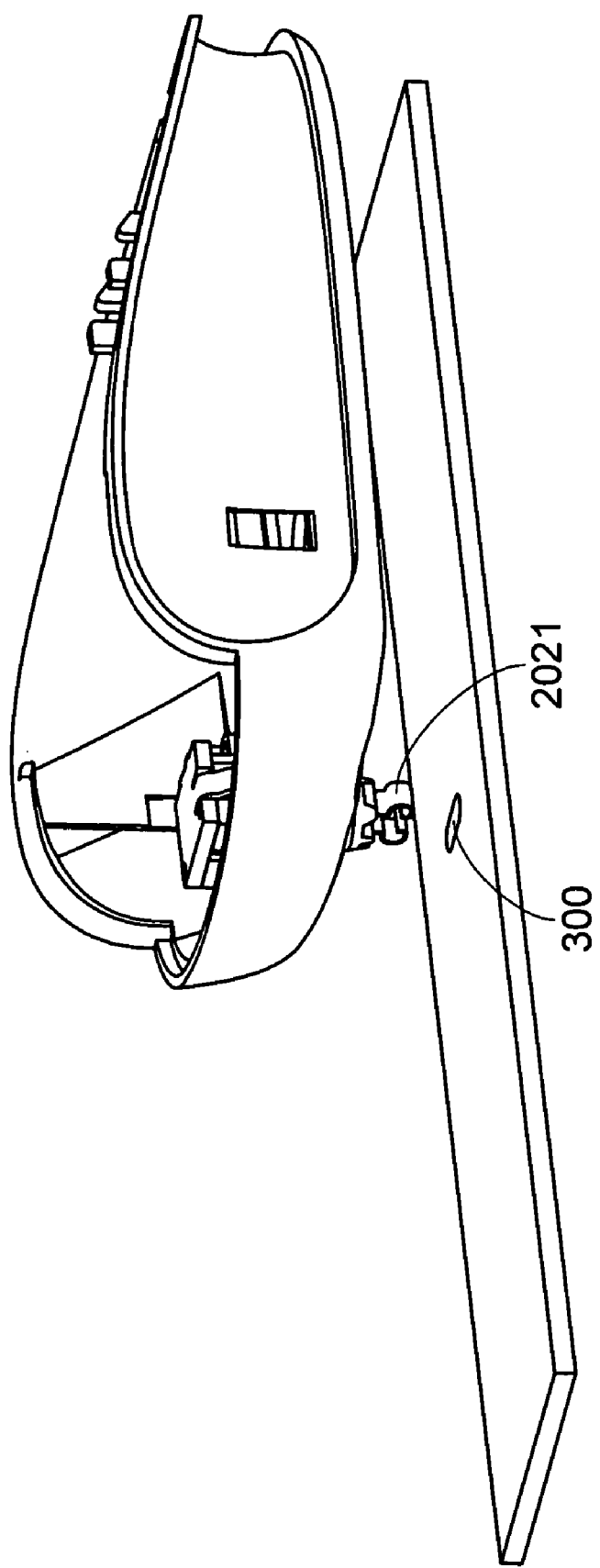
FIG. 5 is a schematic view illustrating that the hooking part of the hook module is protruded from the casing of the mouse.

For a purpose of attaching the mouse onto the notebook computer, the hooking member 202 should be protruded from the lower surface 101 of the mouse 100. In response to a pushing force applied on the operating rod 2012 through a first perforation 103 of the casing 100, the resilient part 2012A of the operating rod 2012 allows disengagement of the stop part 2012B from the hooking member 202. Meanwhile, due to the elastic force of the spring 203, the hooking part 2021 of the hooking member 202 is protruded from the lower surface 101 of the mouse through the second perforation 104, as is seen in FIG. 5.

Figure 6:
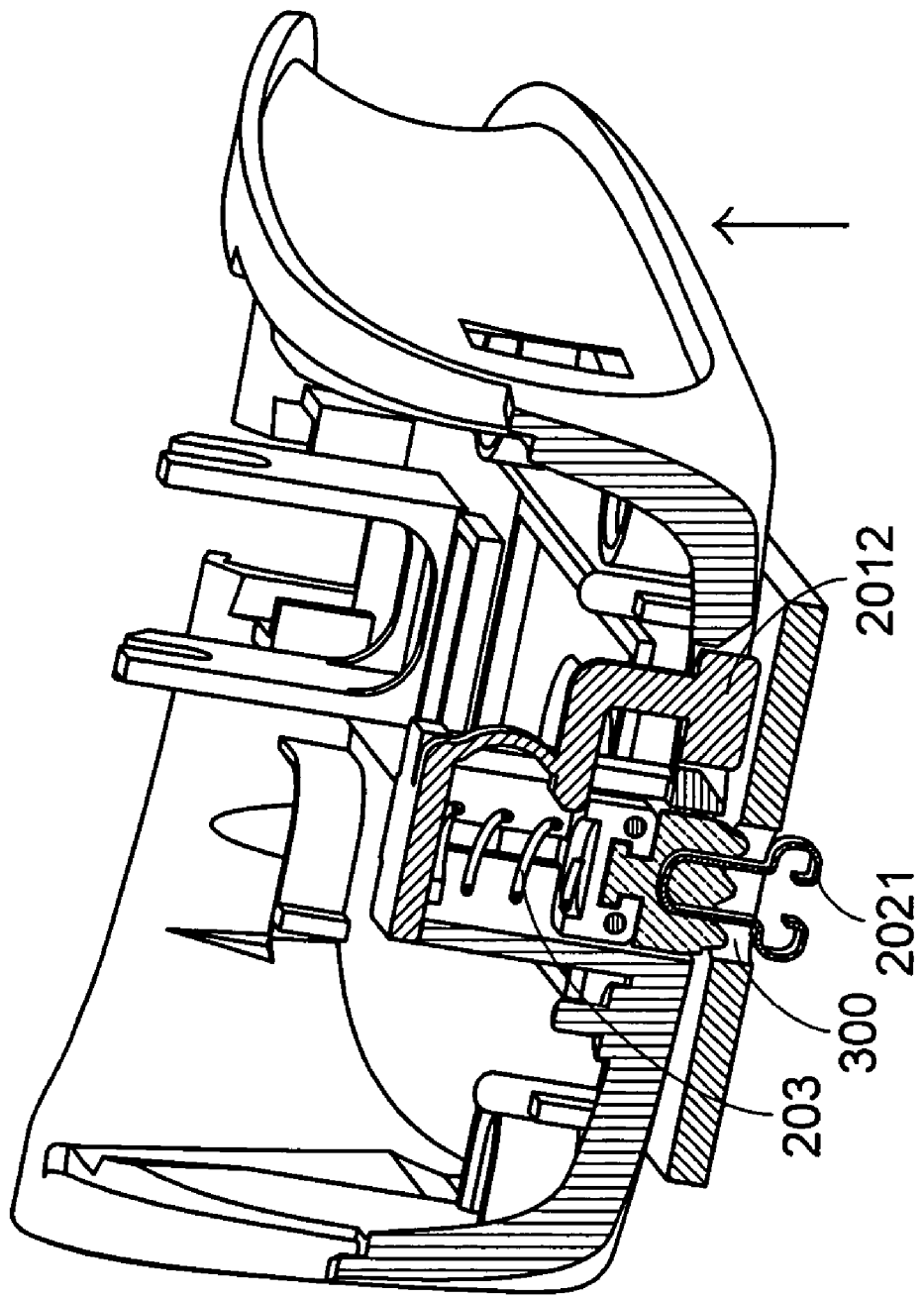
FIG. 6 is a schematic view illustrating that the hooking part of the hook module is hooked onto the lock hole of a notebook computer.

Under this circumstance, as shown in FIG. 6, after the hooking part 2021 is hooked on the lock hole 300, the mouse is attached onto the notebook computer.

After the mouse is detached from the notebook computer, another pushing force is applied on the operating rod 2012 through the first perforation 103 such that the stop part 2012B is disengaged from the hooking member 202. Subsequently, the hooking part 2021 is pushed upwardly to be stored within the casing 100. When the pushing force is released, the spring 203 will be kept in the compressive state and stopped by the stop part 2012B of the operating member 201.

As known, the Kensington lock hole is oval-shaped and may be disposed in different orientation of the notebook computer. Due to the universal joint 204, the hooking part may comply with the Kensington lock hole in each orientation.

From the above description, the hook module of the present invention may facilitate a mouse to be attachable onto a notebook when complying with the Kensington lock hole. By using the mouse having the hook module according to the present invention, no additional coupling mechanism is required to be included in the notebook computer because the Kensington lock hole is a common accessory of the notebook computer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse having a storable hook module, comprising:
   a casing comprising a surface including first and second perforations and a retaining recess disposed within said casing; and
   a hook module disposed within said casing, and comprising:
      an operating member comprising a cover plate and an operating rod, wherein a portion of said operation rod is aligned with said first perforation;
      a hooking member accommodated within said retaining recess and including a hooking part in one end and a connecting part in the other end, wherein said hooking part is aligned with the second perforation; and
      a spring arranged in said retaining recess and sustained between said cover plate and said hooking member.

2. The mouse having a storable hook module according to claim 1 wherein said operating rod and said cover plate are integrally formed.

3. The mouse having a storable hook module according to claim 2 wherein said operating rod includes a resilient part and a stop part.

4. The mouse having a storable hook module according to claim 1 wherein said connecting part of said hooking member includes a circular disc.

5. The mouse having a storable hook module according to claim 4 wherein said hook module further comprises a universal joint between said spring and said hooking member, wherein said universal joint has a first circular indentation structure for accommodating one end of said spring and a second circular indentation structure for accommodating said circular disc of said hooking member.

* * * * *